United States Patent

Doell

(10) Patent No.: US 6,494,605 B1
(45) Date of Patent: Dec. 17, 2002

(54) LONGITUDINAL LIGHT SOURCE

(75) Inventor: Gerhard Doell, Ulm (DE)

(73) Assignee: Patent-Treuhand-Gesellschaft fuer Elektrische Gluehlampen mbH, Munich (DE)

( * ) Notice: Subject to any disclaimer, the term of this patent is extended or adjusted under 35 U.S.C. 154(b) by 18 days.

(21) Appl. No.: 09/786,986

(22) PCT Filed: Jun. 23, 2000

(86) PCT No.: PCT/DE00/02053

§ 371 (c)(1),
(2), (4) Date: Mar. 13, 2001

(87) PCT Pub. No.: WO01/07830

PCT Pub. Date: Feb. 1, 2001

(30) Foreign Application Priority Data

Jul. 21, 1999 (DE) .......................... 199 33 405

(51) Int. Cl.⁷ ......................... A41F 1/00; A61M 1/00; F21V 17/00; F21V 5/00; G02B 6/00
(52) U.S. Cl. .................... 362/581; 362/551; 362/221; 362/222; 362/223; 362/225; 362/265; 362/255
(58) Field of Search .................... 362/581, 551, 362/217, 221, 222, 223, 225, 260, 263, 265, 255, 296; 313/488, 491, 607, 234, 111, 116

(56) References Cited

U.S. PATENT DOCUMENTS

| | | | |
|---|---|---|---|
| 2,362,175 A | * 11/1944 | Swanson | 176/34 |
| 4,935,632 A | 6/1990 | Hart | |
| 5,400,224 A | 3/1995 | DuNah et al. | |
| 5,667,289 A | 9/1997 | Akahane et al. | |
| 5,857,758 A | * 1/1999 | Dealey, Jr. et al. | 362/32 |
| 5,998,921 A | * 12/1999 | Nakaya et al. | 313/491 |

FOREIGN PATENT DOCUMENTS

| | | |
|---|---|---|
| DE | 41 27 100 A1 | 2/1993 |
| DE | 197 18 395 | 10/1998 |

OTHER PUBLICATIONS

Patent Abstracts of Japan, vol. 017, No. 653, Dec. 3, 1993, & JP 05 217493 A (Toshiba Electric Equipment Co.) abstract.
Patent Abstracts of Japan, vol. 016, No. 105, Mar. 16, 1992, & JP 03 280079 A (Toshiba Lighting & Technol Corp) abstract.

* cited by examiner

Primary Examiner—Alan Cariaso
Assistant Examiner—Sharon Payne
(74) Attorney, Agent, or Firm—Carlo S. Bessone

(57) ABSTRACT

An elongate light source (1) having at least one elongate lamp (3) with two ends, which has a light-guiding element (2; 4; 5) at at least one end.

16 Claims, 3 Drawing Sheets

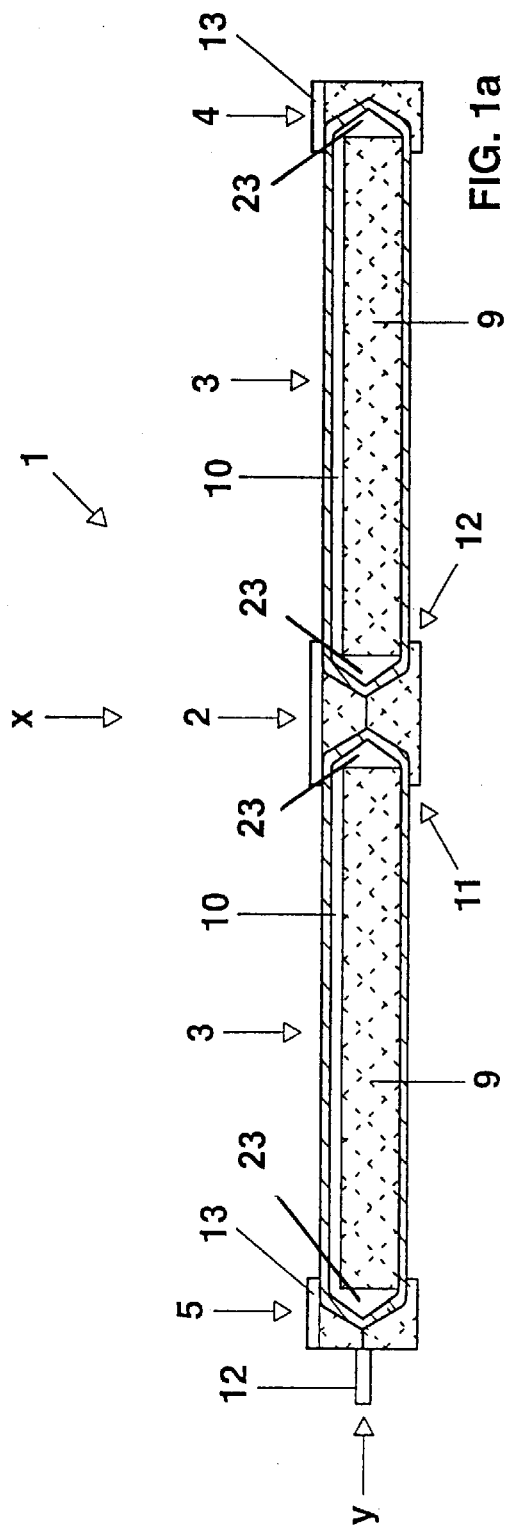
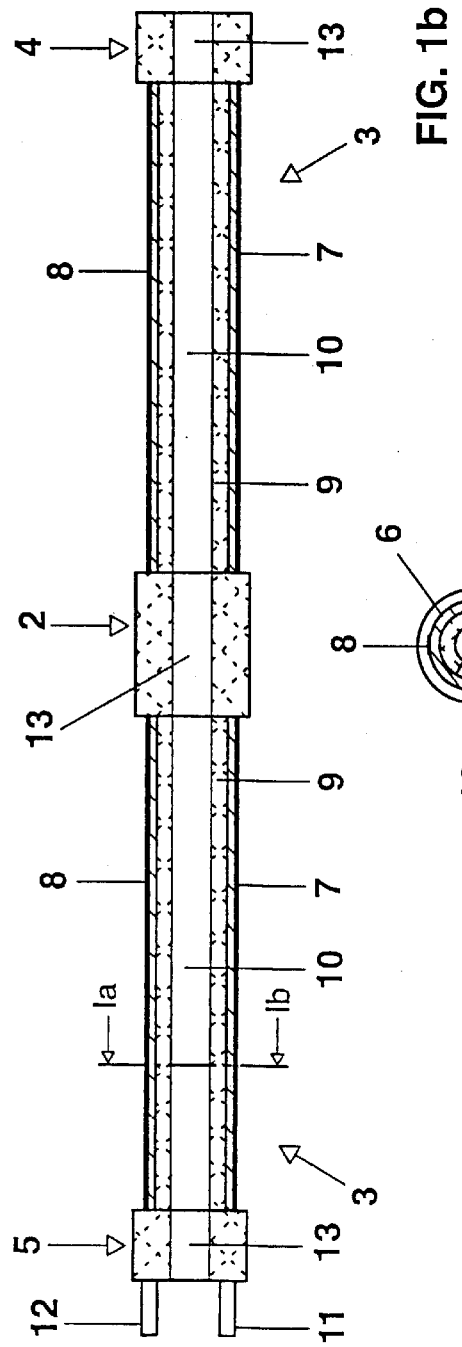
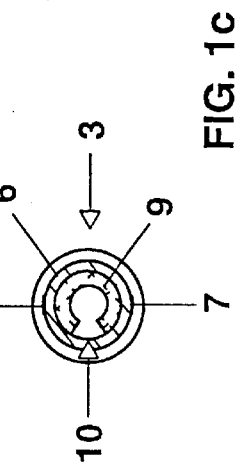
FIG. 1a
FIG. 1b
FIG. 1c

LONGITUDINAL LIGHT SOURCE

TECHNICAL FIELD

The invention proceeds from an elongate light source in accordance with the preamble of claim 1.

Such light sources are used, for example, in combination with an optical conductor plate for the purpose of back lighting displays, in particular liquid crystal displays (LCDs), but also large-area billboards.

For this purpose, the light of the elongate light source is launched into the optical conductor plate (so-called edge-light technique) through at least one narrow side (edge) thereof. By means of reflection at a diffuse reflecting layer fitted on the underside of the optical conductor plate, this light passes through to the outside over the entire front side of the optical conductor plate, and thereby acts like a flat light source extended in accordance with the dimensions of the optical conductor plate.

Use is made, for example, of tubular or else curved, for example L-shaped or U-shaped fluorescent lamps, as elongate light source.

In order to increase the luminance, the elongate light sources can be provided along their longitudinal axis on the inside or outside of the lamp vessel with a reflector for visible light which is cut out over a defined region along the longitudinal axis. This creates an aperture through which the light of the lamp passes to the outside (aperture lamp).

Elongate light sources are, however, also used for general lighting as well as for decorative purposes and, increasingly, in automobile engineering, for example as a flasher light or stop light, and for interior lighting. Of particular significance for most of the said purposes of use is the possibility of adapting the elongate light source to a prescribed shape, for example the shape of a motor vehicle, for use as a motor vehicle flasher light.

PRIOR ART

Although the invention develops its advantageous effect with all elongate lamps which emit a significant proportion of their light flux through the end face of one or both lamp ends, elongate lamps based on dielectrically impeded discharges with strip-shaped electrodes have proved to be particularly advantageous. By contrast with conventional electrodes fitted at the respective end faces of the cylindrical discharge vessel, this shape of the electrodes also permits the length of the non-luminous ends to be kept to a minimum.

Such a lamp is known, for example, from DE-C 197 18 395 C1. This is a tubular aperture fluorescent lamp which has at one end a base with two connecting pins. The lamp also has parallel to the tube longitudinal axis two diametrically arranged strip-shaped electrodes, one of them on the outer wall and the other on the inner wall of the discharge vessel. The two electrodes are connected in the interior of the base to the two connecting pins. The connecting pins are, for their part, connected via electric lines to the two poles of a pulsed voltage source. The lamp is distinguished by a relatively high useful radiation efficiency.

However, the light flux emitted axially at the two lamp ends through the respective end face remains unused. Moreover, it is difficult to bend such lamps into a non-tubular, for example L shape, without influencing the electrode tracks undesirably. When bending the lamp vessel, there is the risk that the electrode tracks will become detached from the vessel wall, at least in regions of large curvature.

SUMMARY OF THE INVENTION

It is the object of the present invention to provide an elongate light source in accordance with the preamble of claim 1 which avoids the disadvantages of the prior art and which can be implemented in virtually any desired shapes and lengths in a simple way.

A further aspect of the invention is to make use, in a substantially radial direction, of the light flux emerging axially from the end faces of the elongate light source.

This object is achieved by means of the characterizing features of claim 1. Particularly advantageous refinements are to be found in the dependent claims.

Moreover, protection is gained for a lighting device having this elongate light source, in particular for back lighting LCDs.

The fundamental idea of the invention is based on the finding that in the case of elongate lamps a substantial fraction of the total light flux is coupled out in some circumstances in the axial direction from the end faces of the lamp ends. The reason for this with fluorescent lamps is to be seen in that owing to the fluorescent coating or, with aperture lamps, to the reflector coating the tubular discharge vessel acts like a tubular optical conductor (light pipe) which guides the light along the tube axis. This effect occurs in a particularly pronounced fashion with the elongate lamps, mentioned at the beginning, based on dielectrically impeded discharges and having strip-shaped electrodes. By contrast with elongate lamps with electrodes arranged conventionally in an axial fashion at the two ends of the tubular discharge vessel, for example incandescent filaments or cold cathodes, it is possible, specifically, for the light—in the case considered here—to leave the discharge vessel axially through the ends in a substantially unimpeded fashion.

The invention now proposes an elongate light source having at least one elongate lamp with two ends which has a light-guiding element at at least one end.

The function of such a light-guiding element consists essentially in at least largely picking up the light passing through the relevant end of the lamp during operation of the lamp, and in re-emitting it in a suitable spatial distribution for the targeted lighting purpose.

The or each light-guiding element consists of a transparent non-conducting plastic material, for example acrylic glass. The elements can thereby be produced relatively cost-effectively, for example using injection molding technology.

In one embodiment, a light-guiding element is provided with a depression for holding a lamp. In this way, the light-guiding element picks up the light emerging through the lamp end and emits it outwards in a preferably radial fashion by means of scattering inside the light-guiding element. The light losses during passage through the optical conductor are negligible in this case.

The surface of the light-guiding element is suitably shaped in order to influence the spatial emission characteristic. Thus, the surface can be matted in order to achieve a virtually Lambertian light distribution in all spatial directions, such as fluorescent lamps also have. Another possibility consists in silvering all the surfaces, with the exception of the depression for light launching and a narrow, matted strip for light outcoupling (aperture), for example by vacuum deposition with aluminum or bonding with a reflecting film. If the light strikes the non-silvered surface of the element, it is coupled out. If it strikes a reflecting surface, it is reflected back into the light-guiding element. This happens until it strikes the exit surface (aperture) and can leave the element. In this way, the light-guiding element appears bright, as if the light were generated therein. The matting is preferably to be employed in the case of the use of fluorescent lamps, the silvering, by contrast, chiefly in the case of aperture fluorescent lamps.

In a development, the light-guiding element additionally functions as a base. Moreover, it is also provided that the light-guiding element base has terminals for connecting to an electric ballast. For the purpose of supply using an electric ballast, the terminals are connected to the electrodes. In the case of a lamp with a base at both ends, it is generally sufficient when only one of the two bases has terminals.

If the lamp is used in conjunction with an optical conductor plate, for example for back lighting LCDs, the at least one light-conducting element has a bevel which encloses with the lamp longitudinal axis an angle typically in the range between approximately 30° and 60°, preferably between approximately 40° and 50°, with particular preference approximately 45°. As a result, the light emitted from the lamp in the axial direction is directed by internal reflection in the direction of the edge of the optical conductor plate and launched into the latter without high losses.

In this way, a lamp can be used which is shorter than the corresponding optical conductor plate. This also prevents either the base elements from projecting beyond the optical conductor plate or the optical conductor plate from appearing dark at its corners. Moreover, the use of the light emitted in the axial direction improves the total efficiency of the launching of the light.

In a further embodiment, the light-guiding element additionally functions as a coupler for at least two lamps. For this purpose, the light-guiding element has at least two depressions which are at a defined angle to one another and which each hold one end of the lamps. Moreover, the coupling elements contain electric contacts which permit the individual lamps to be connected electrically to one another. Since the couplers are relatively bright owing to the light-guiding effect explained above, the impression is of a continuous row of luminaires. Moreover, the row of luminaires can be shaped substantially freely by suitable selection of the angle between the depressions for the lamp ends, for example as an "L" or "V" etc. More complex shapes, for example arcs and the like, can also be at least approximated with the aid of a plurality of lamps. Thus, a light-guiding element coupler has exactly four functions: 1. mechanical holding of the lamps, 2. shaping of the light source, 3. electric connection of the lamps, and 4. light guidance and the redistribution of the light emerging axially from the lamp ends.

Such quasi-continuous "rows of luminaire" consisting of two or more lamps can be implemented relatively easily with the aid of the light-guiding elements and in conjunction, for example, with the pulsed mode of operation, preferred here and described in WO94/23442, for dielectrically impeded discharges.

Specifically, the said mode of operation permits a plurality of lamps to be operated serially, or the discharges of the respective lamps to be operated in parallel. If, for example, two linear lamps of the same length are connected to one another electrically such that the cathode is connected to the cathode and the anode is connected to the anode (parallel connection), the result is a light source whose length has been simply doubled. However, this light source can be ignited and operated with the same voltage as that of the individual lamps since, according to the electrode configuration explained at the beginning, the discharge runs perpendicular to the lamp axis, and therefore the arcing distance does not change with the lamp length. It is thereby possible to operate a series of two or more lamps with a single ballast via the electric contacts at the light-conducting elements.

Of course, it is also possible to provide individual coupling elements with a cable connection to the ballast in order, for example in the case of long rows of luminaires, to use more than one ballast or, if it is more favorable, to place the ballast more in the middle of the row than at its end.

Moreover, it is also possible for curved lamps to be connected to one another with the aid of the light-guiding elements when, for example, the desired radius of curvature is small, for example in the case of a right angle, but the aim overall is to produce a more or less continuously curved shape of the row of luminaires.

It is likewise possible according to the invention to implement a flexible row of luminaires of arbitrary length. The coupling elements described are produced for this purpose from a flexible light-conducting material.

A great advantage of the invention consists consequently in being able to implement virtually any shape and length of rows of luminaires from the standardized components of light-conducting element base, light-conducting element coupler, lamp and electronic ballast. This modular concept combines high flexibility, with regard both to the length and to the shape of the light source, with cost-effective production.

Again, dark zones are avoided at the ends, that is to say the length of the light source corresponds to the total length of the lamp with base.

In a development, the light-conducting elements have holders with the aid of which the elongate light source can be mounted on a support, for example a luminaire.

DESCRIPTION OF THE DRAWINGS

The aim below is to explain the invention in more detail with the aid of a plurality of exemplary embodiments. In the drawing:

FIG. 1a shows an elongate light source having two tubular aperture fluorescent lamps, coupled by means of light-guiding element couplers, and two light-guiding element bases, in longitudinal section, FIG. 1b is like FIG. 1a, but in plan view along the direction x, FIG. 1c like FIG. 1b, but a cross section along the line Ia–Ib.

FIGS. 1a, 1b, 1c respectively show diagrammatically a longitudinal section, a plan view along the direction x and a cross section along the line Ia–Ib of an elongate light source 1 according to the invention and having two tubular aperture fluorescent lamps 3 coupled by means of light-guiding element couplers 2, and two light-guiding element bases 4, 5.

Figure 2:
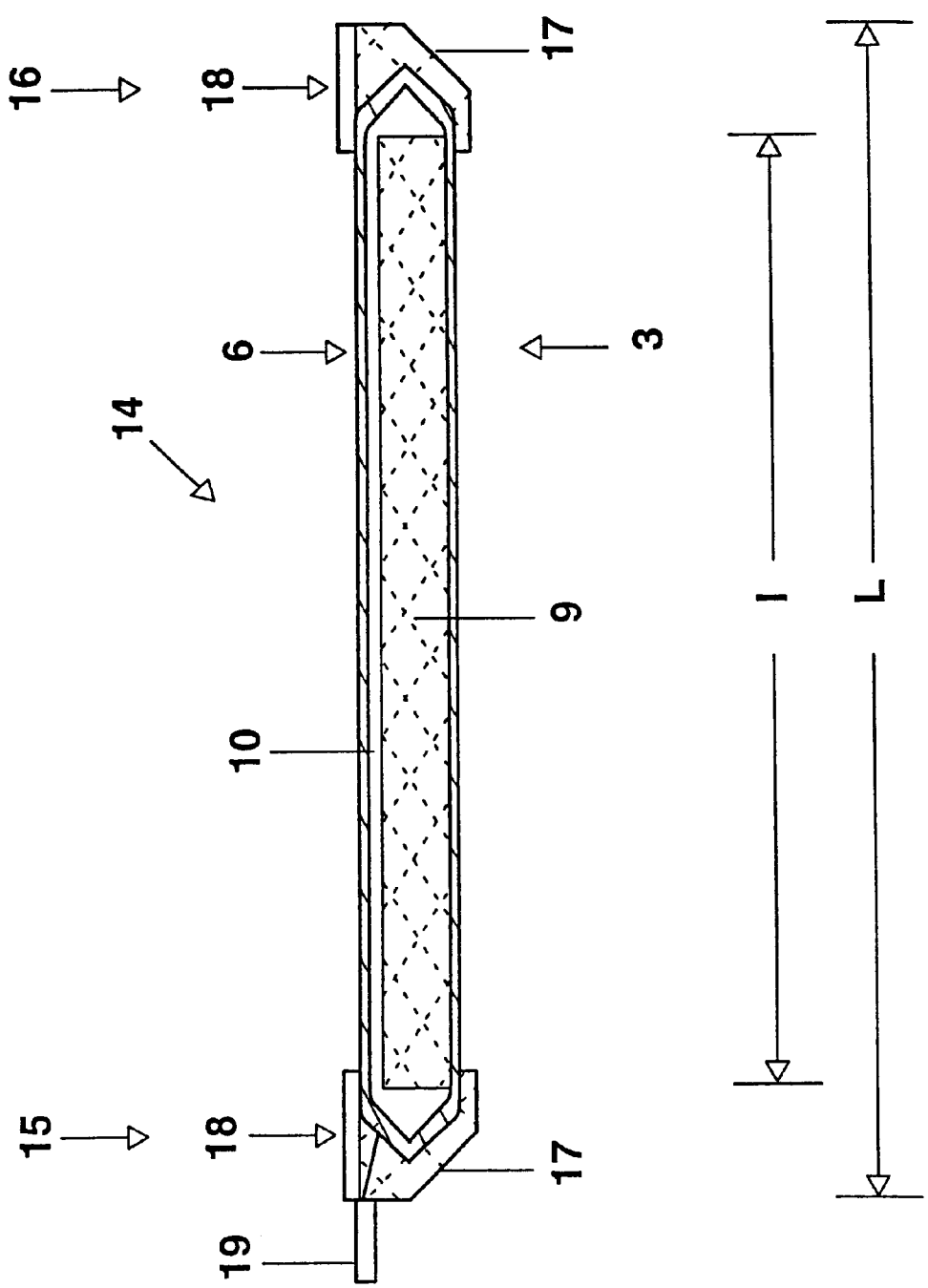
FIG. 2 shows an elongate light source having a tubular aperture fluorescent lamp and two bases with a bevel in longitudinal section.

The discharge vessel 6 of each lamp 3 has two linear electrodes 7, 8, which are arranged on the outer wall of the discharge vessel 6 diametrically and parallel to the longitudinal axis of the tubular lamps 3. The discharge vessel 6 consists of glass and thus acts for the electrodes 7, 8 as a dielectric barrier with reference to the interior of the discharge vessel 6, that is to say during lamp operation with reference to the discharge. This is therefore a discharge dielectrically impeded at both ends. The inner wall of the discharge vessel 6 has a fluorescent layer 9, an elongate aperture 10 being cut out. Xenon at a filling pressure of approximately 15 kPa is located in the interior of the discharge vessel 6.

The light-guiding element coupler 2 has two diametrically arranged cylindrical depressions 23 for holding one end each of the two lamps 3. The electrodes 7, 8 are connected to one another in pairs in each case inside the light-guiding element coupler 2, that is to say the electrode 7 of the first lamp 3 is connected to the corresponding electrode 7 of the second lamp 3 and, by analogy, the electrode 8 of the first lamp 3 is connected to the corresponding electrode 8 of the second lamp 3 (not illustrated).

One of the two light-guiding element bases 4, 5 is respectively arranged at each of the two ends of the elongate light source 1. Moreover, one of the two bases 5 has two connecting pins 11, 12 for connecting an electric ballast (not illustrated). During operation, via these connecting pins 11, 12 both the first lamp 3 and, with the aid of the light-guiding element coupler 2, the second lamp 3 are supplied with the aid of a common electric ballast.

The ballast preferably supplies active power pulses in accordance with WO94/23442 already cited at the beginning. A suitable circuit arrangement for implementing this pulsed mode of operation for dielectrically impeded discharges is to be found in EP-A-0 781 078, the disclosure of which is hereby adopted as reference.

The light-guiding elements 2, 4, 5 consist of acrylic glass and, like the two lamps 3, in each case have an aperture 13. Consequently, during operation of the lamp the viewer perceives in the region of the lamp apertures 10 and of the light-guiding element apertures 13 a narrow bright band of light which is longer than the total length of the two individual lamps 3.

It may be pointed out once again at this juncture that it is also possible for three or more lamps to be connected with the aid of appropriate light-guiding element couplers to form an elongate light source according to the invention. Likewise, the depressions 23 of the light-guiding element couplers and, consequently, the lamps arranged therein can also be at an angle to one another which differs from 180° (=tubular), for example right angled, acute or obtuse angled, L- or U-shaped etc.

FIG. 2 shows a diagrammatic longitudinal section of a further elongate light source 14 according to the invention. Similar features to those in FIGS. 1a–c are provided with the same reference numerals. The light source 14 comprises a tubular aperture fluorescent lamp 3 which is provided at both ends with bases 15, 16. The aperture fluorescent lamp 3 is of the same type as that in FIG. 1, that is to say it also has two linear electrodes (not visible) on the outer wall of the discharge vessel 6. Again, the inner wall of the discharge vessel 6 is likewise provided with a fluorescent layer 9, with the exception of the aperture 10.

The two bases 15, 16 each have a bevel 17 which encloses an angle of 45° with the longitudinal axis of the lamp 3. The bases 15, 16 are silvered with the aid of the 3M Scotch Brand 850 reflecting film, in each case only one aperture 18, opposite the bevel 17, being cut out. The light emerging axially from the lamp ends during operation is thereby reflected, inter alia, by the bevel 17 and coupled out via the base aperture 18, specifically in the same direction as the light coupled out through the lamp aperture 10. In other words, with the aid of the light-guiding element bases 15, 16 with bevel 17 and aperture 18 the axial light flux of the lamp 3 is deflected in the direction of the light flux emitted through the lamp aperture 10. The effective luminous length L of the light source 14 is thereby greater than the actual length l of the lamp 3 itself. Moreover, the total light flux of the light source 14 in the direction of its aperture 10, 18 is higher than in the case of a comparable lamp without light-guiding element bases 15, 16, since the axial light flux is also used owing to the light-guiding element bases 15, 16.

One of the two bases 15 has two connecting pins 19 (only one is visible), which are connected to the two electrodes (not illustrated) and serve for connecting an electronic ballast.

Figure 3:
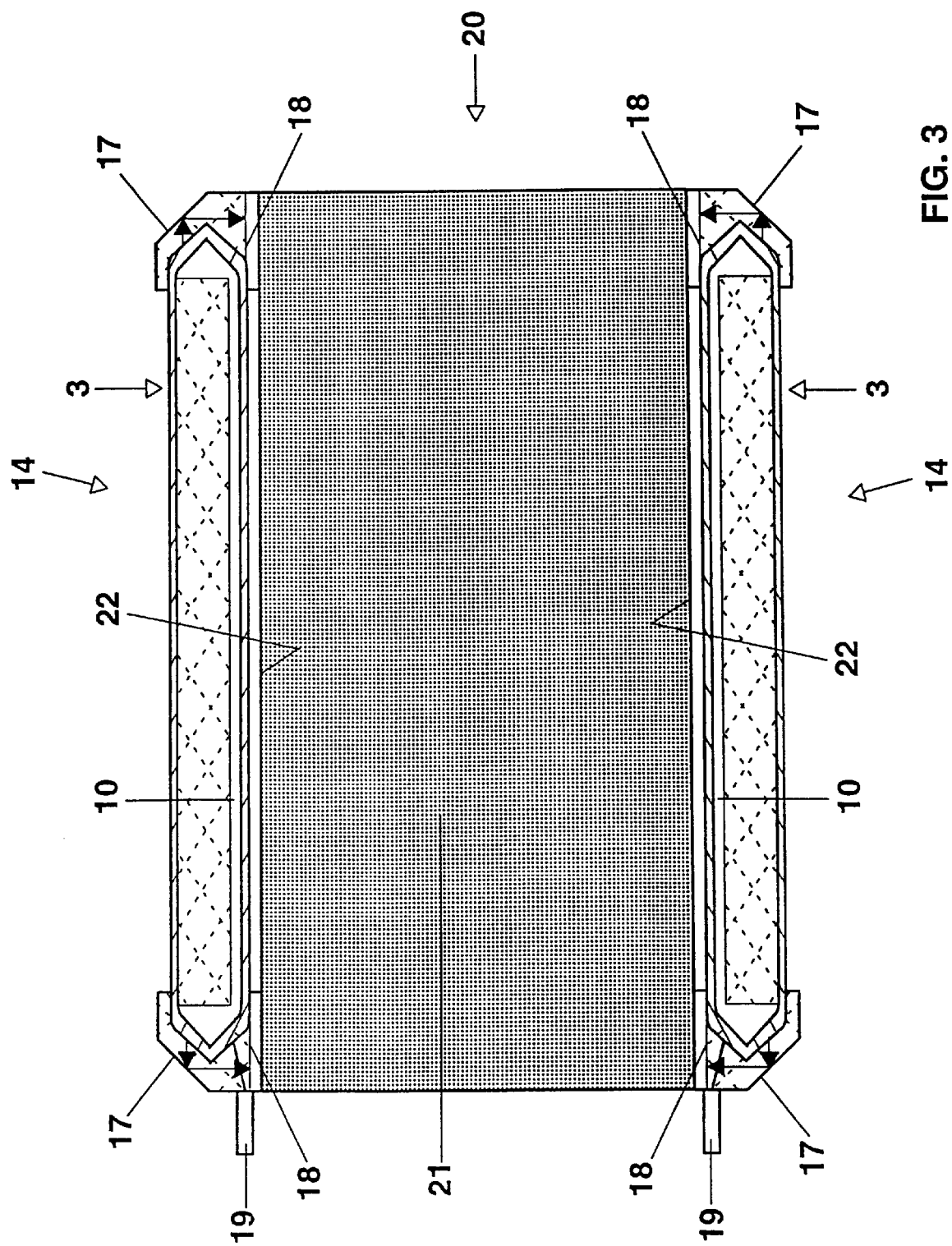
FIG. 3 shows a flat lighting device having an optical conductor plate and two elongate light sources in accordance with FIG. 2.

FIG. 3 illustrates diagrammatically in a section a flat lighting device 20 having an optical conductor plate 21, resembling a cuboid, and two elongate light sources 14 in accordance with FIG. 2. Similar features to those in FIG. 2 are provided with the same reference numerals.

One of the two elongate light sources 14 is arranged in each case at the two long narrow sides 22, opposite and parallel to one another, of the optical conductor plate 21 in such a way that the lamp apertures 10 and the base apertures 18 directly face the narrow sides 22. In this way, light is launched into the optical conductor plate 21 over the entire length of the narrow sides 22 without the lamps projecting beyond the optical conductor plate or else the base area being dark and thus the luminance distribution of the optical conductor plate falling off sharply toward the edge.

What is claimed is:

1. A lighting device comprising an elongate light source including at least two elongate lamps, the elongate lamps are coupled to one another by means of a light-guiding element having two depressions for holding the two lamps, the two depressions forming an angle relative to one another.

2. The lighting device as claimed in claim 1 wherein each of the elongate lamps has two ends and each of the lamps has a light-guiding element at at least one end.

3. The lighting device as claimed in claim 1 wherein the light-guiding element consists of an at least partially transparent insulating material.

4. The lighting device as claimed in claim 1 in which the light-guiding element has electric contacts for supplying a supply voltage to the lamps.

5. The lighting device as claimed in claim 1 wherein a lateral surface of the light-guiding element has a configuration in which during operation light launched into the light-guiding element leaves the light-guiding element through the lateral surface in a substantially uniform way.

6. The lighting device as claimed in claim 1 wherein the light-guiding element has a reflector with an aperture such that during operation light launched in a substantially axial fashion into the light-guiding element leaves the light-guiding element in a substantially radial direction through the aperture.

7. The lighting device as claimed in claim 6 wherein a surface of the light-guiding element is provided with a curvature—relative to a longitudinal axis of the lamp connected to the light-guiding element—such that during operation light launched in an essentially axial fashion into the light-guiding element is deflected by approximately 90° and leaves this light-guiding element in an essentially radial direction through the aperture.

8. The lighting device as claimed in claim 1 wherein the light-guiding element has a bevel which encloses an angle in the range between 30° and 60° with the longitudinal axis of the lamp connected to the light-guiding element.

9. The lighting device as claimed in claim 1 wherein the light-guiding element has a bevel which encloses an angle in the range between 40° and 50° with the longitudinal axis of the lamp connected to the light-guiding element.

10. The lighting device as claimed in claim 1 wherein the light-guiding element has a bevel which encloses an angle of approximately 45° with the longitudinal axis of the lamp connected to the light-guiding element.

11. The lighting device as claimed in claim 1 having at least one light-guiding element as lamp base.

12. The lighting device as claimed in claim 1 having at least one light-guiding element as coupling element, each coupling element coupling two elongate lamps to one another.

13. The lighting device as claimed in claim 1 wherein at least one light-guiding element having means for fastening the light source on a support.

14. The lighting device as claimed in claim 1 wherein the elongate lamp having a discharge vessel is suitable for operation by means of dielectrically impeded discharge, and has elongate electrodes which are arranged parallel to a longitudinal axis on a wall of the discharge vessel of the lamp, and in which at least a portion of the electrodes is separated from the interior of the discharge vessel by a dielectric.

15. The lighting device as claimed in claim 1 in which in each case two elongate lamps are coupled to one another by means of a light-guiding element, which light-guiding element has two depressions for holding these two lamps and the two depressions forming an angle relative to one another.

16. The lighting device as claimed in claim 1, and an optical conductor plate, the elongate light source being arranged opposite at least one narrow side of the optical conductor plate.

* * * * *